Nov. 5, 1935.  J. K. H. STICHER  2,020,128
METHOD OF AND MEANS FOR CONTROLLING CABLE TEMPERATURE
Filed Aug. 27, 1932  2 Sheets-Sheet 1
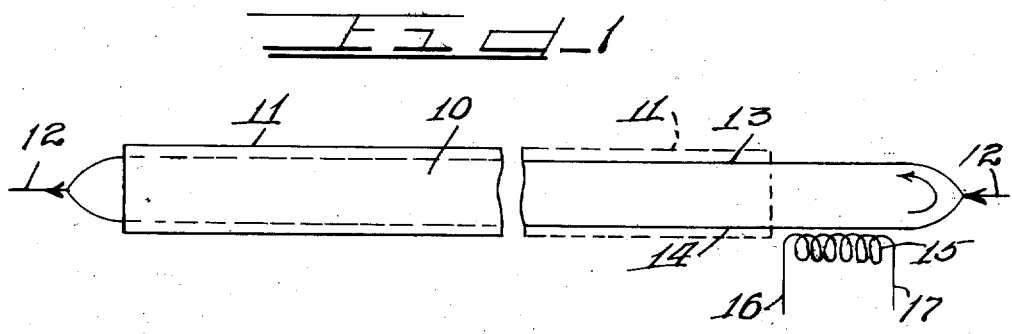
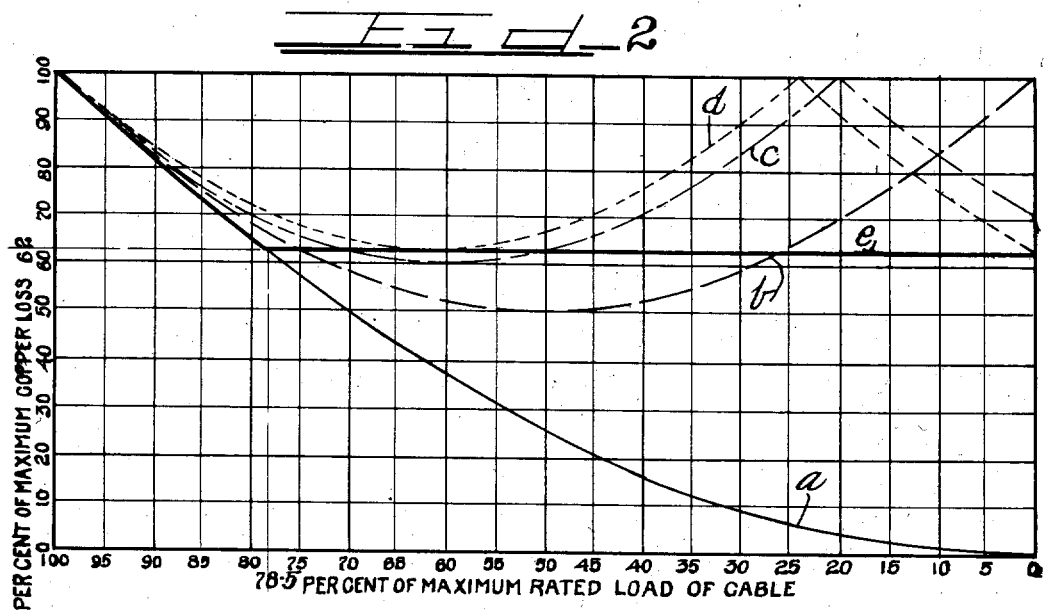

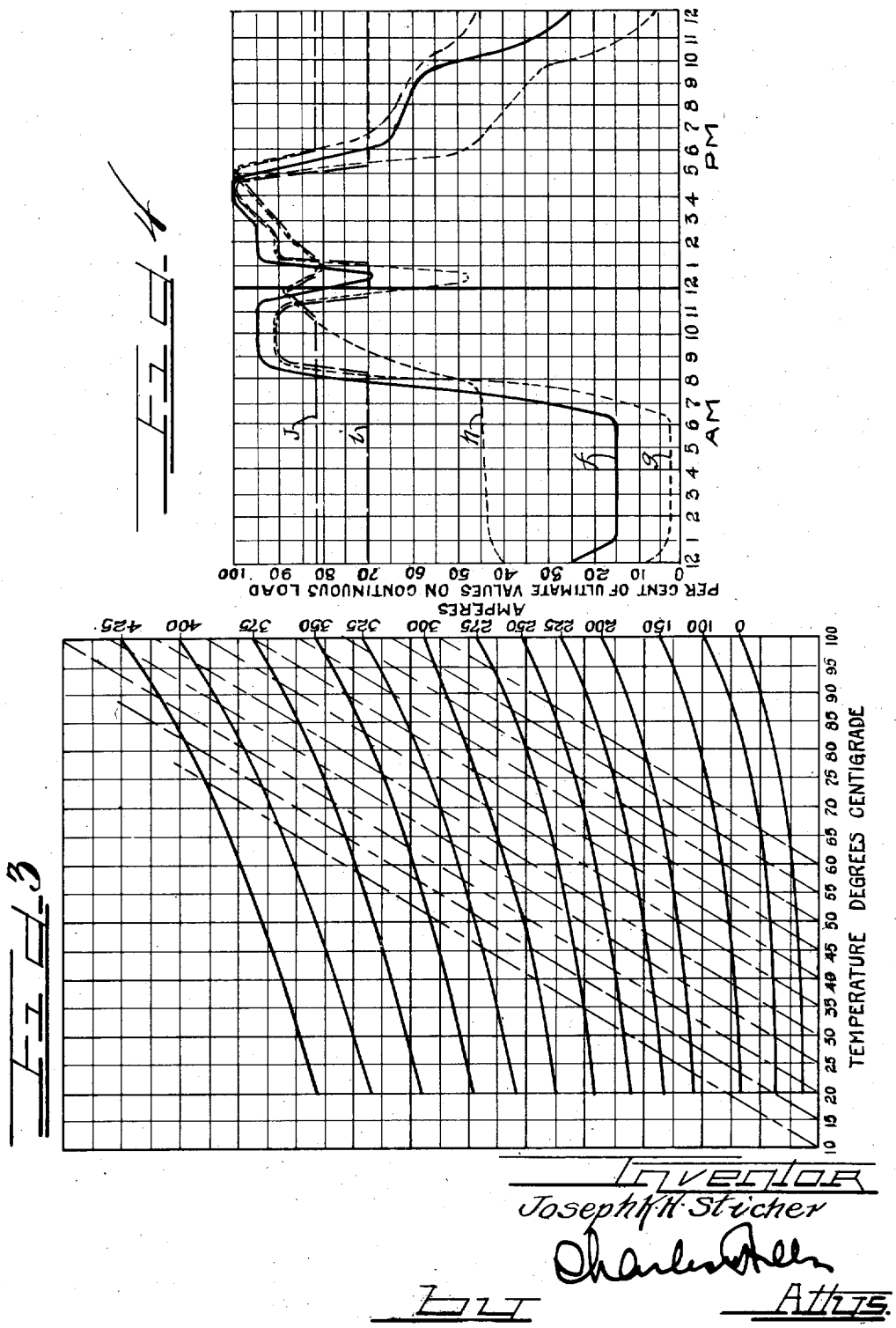

Patented Nov. 5, 1935

2,020,128

UNITED STATES PATENT OFFICE 2,020,128

METHOD OF AND MEANS FOR CONTROLLING CABLE TEMPERATURE

Joseph K. H. Sticher, Detroit, Mich., assignor to The Detroit Edison Company, Detroit, Mich., a corporation of New York Application August 27, 1932, Serial No. 630,680

8 Claims. (Cl. 171—97)

This invention relates in general to the method of controlling the heating and consequently the temperature of a cable and is concerned with the provision of means which may be operated in such a manner as to enable the method to be utilized in controlling the cable temperature independently of the amount of load current being carried by the cable.

It has long been realized by those skilled in the art that many cable failures are caused by the formation of voids in the cable insulation as a result of physical stresses, due to changes of temperature and of various conditions of load, and the subsequent deterioration thereof by ionization taking place in the voids so formed.

In addition to the above noted cause of failure in cables, the variation of temperature as a result of operating the cable under different conditions of load, may cause failure for reasons other than ionization, such as, abrasion of the component cable parts due to their movement, wrinkling and crackling of the lead sheath due to longitudinal expansion and contraction, and migration of the compound used in the cable.

It will therefore be apparent that a large percentage of cable failures may be attributed primarily to changes in the cable characteristics due to changes in temperature; and, that, if means were provided for maintaining the cable temperature substantially constant regardless of whether the cable might be carrying full load or no load, most if not all of the cable failures would be eliminated.

With the foregoing in mind, this invention contemplates the provision of means whereby the conductor $i^2R$ losses in a cable may be maintained substantially constant independently of the load current carried by the cable conductor. To this end, the conductor of the cable is split into two parts, which are electrically in parallel and form a loop within the cable. This loop is not only used for conducting the load current through the cable but also forms a closed circuit wherein an auxiliary current is superimposed upon the load current. This superimposed current may be supplied from a low voltage source such as a transformer, and, since it may be controlled independently of the load current, the conductor losses which heat up the cable may be adjusted so as to maintain the temperature of the cable substantially constant.

It is therefore a further object of this invention to provide a cable of such construction and design as to enable maintaining the temperature thereof substantially constant by means of a current other than the load current, which may be circulated within the cable.

It is a further object of the invention to provide a cable of the split-core type and to selectively proportion the current in the conductors thereof in such a manner as to produce abnormal heating of the cable that is greater than normal for loads that are less than a predetermined maximum load.

It is a further object of the invention to provide a method whereby the cable temperature may be maintained within predetermined limits.

It is a further object of the invention to provide means whereby the heating effect is produced in the cable which does not follow the $i^2R$ law of the cable for load current, thereby enabling the temperature of the cable to be maintained substantially constant regardless of the load being carried by the cable.

It is also an object of the present invention to provide a method whereby the temperature of a cable may be maintained substantially constant and means for practicing the method, said means being adapted to circulate current in the cable at times when the cable is not carrying load current.

It is also an object of the present invention to provide as an article of manufacture a cable which is adapted not only to carry the load current imposed thereon but is also arranged so that an additional auxiliary current may be circulated therein to enable maintaining the cable temperature at a predetermined value independently of the cable temperature resulting by virtue of the $i^2R$ losses due to load current.

Other objects of this invention will more fully appear from the following detail description taken in connection with the accompanying drawings which illustrate a single embodiment thereof, and in which Figure 1 is a view diagrammatically showing the components parts of the cable embodying the features of this invention and illustrating means electrically connected to the cable for maintaining the temperature of the cable substantially constant;

Figure 2 is a graph showing copper losses for different load conditions for ordinary cable and cable embodying the features of this invention;

Figure 3 is a graph showing the temperature of a cable mounted in a duct supplied with air at a given temperature when carrying a definite load; and Figure 4 is a characteristic load curve showing watt loss and copper temperature for ordinary cable and for cable operating in accordance with the present invention.

As shown on the drawings:

In Figure 1, there is diagrammatically illustrated a single conductor cable of the type embodied in the present invention. The cable is generally indicated at 10 and comprises the conventional lead covering or sheath 11 which contains the cable conductors, these conductors being mounted as is the usual practice in some form of insulating compound or material having suitable dielectric characteristics depending upon the installation voltage requirement.

Instead of utilizing a single conductor throughout the length of the cable, this invention contemplates the use of a single conductor 12 which is split within the cable so as to form two parallel paths 13 and 14 for conducting the load current through the cable. Although the respective cross sectional areas of these two parallel paths may be varied relative to each other as will be described in detail subsequently, it is preferred that the total area of these parallel paths should be equal to or substantially equal to that of the single conductor 12, which is the same size as in the conventional type cable. In order to keep the cable losses substantially constant irrespective of the load current being carried by the cable, a current transformer 15 is provided at one end of the loop formed within the cable by the parallel paths 13 and 14. Since this loop forms the secondary of the transformer, it will be apparent that when the primary of the transformer is connected to a suitable source of supply as indicated by conductors 16 and 17, it will be possible to induce a circulating current within the loop, this current being superimposed upon the load current.

With the foregoing arrangement, the operation will be briefly as follows: As long as the cable is carrying its maximum rated load current, the load current flowing through the parallel paths 13 and 14 will be distributed in accordance with the cross sectional areas of the paths or, in other words, in accordance with the respective resistances of the parallel paths. As the load current decreases, the impedance of path 14 is increased by means of the transformer 15 to such a value, that the current flowing through path 13 will be maintained nearly constant. Only that part of the load current will flow through path 14 which cannot be safely carried by path 13. When the load current continues to drop, a point will be reached, where no current flows through path 14, with path 13 fully loaded. As the load current is further decreased from this point, the path 13 cannot be kept fully loaded. An auxiliary current is now superimposed upon the load current by means of the current transformer, in order to keep the path 13 loaded. In this way the path 13 is kept fully loaded and the difference between the total current flowing in path 13 and the load current will return through path 14. It will therefore be apparent that with this arrangement it is possible to superimpose an auxiliary current upon the load current, the auxiliary current circulating within the loop formed by the parallel paths 13 and 14, and the cable losses may be maintained substantially constant for different values of load current. Since the heating of the cable is proportional to the losses, the temperature of the cable will be maintained substantially constant at different loads.

The operation of the above described method of maintaining the temperature of the cable constant will be effected by the relative cross sectional areas of the parallel paths 13 and 14. In order that this effect may be more clearly understood, there is shown in Figure 2 a series of curves wherein the percent of maximum copper loss is plotted against percent of maximum rated load for a conventional type cable and for cables having different relative cross sections in the parallel paths, these cables being operated in the manner previously described. As shown by curve a, which is for conventional cable, it will be observed that at 100% load the copper losses are 100% and that these losses decrease to 0 when the load on the cable is likewise reduced to 0. Since the temperature of the cable is proportional to the copper losses, it will therefore be apparent that from full load to no load on a conventional ordinary type cable, the temperature will vary over a large range. If the single conductor of the cable for which curve a is plotted is now split so as to have two parallel paths of equal cross section, then curve b will be obtained, when the cable is operated in the manner described above. From this curve it will be observed that the copper losses reach a minimum of substantially 50% at 50% of the rated load of the cable and that at no load the copper losses are 100%. In other words by providing equal parallel paths and operating the cable as described, the average value of temperature from full load to no load is materially increased, that is, is more constant than in the case of ordinary cable. Curve c shows the result obtained when the path 13 has a cross sectional area of 60% of the total area of the conductor and path 14 is 40% of the total area of the conductor. For this curve it will be observed that the copper losses are substantially 60% at 60% of the rated load and that the copper losses again reach 100% at 20% rated load. Examination of curves a, b, and c discloses that if the ratio of path 13 to path 14 is not equal to unity the curve will have two minima. It has been found that the best ratio is the one wherein these two minima are equal. From calculations, it has been found that, if path 13 is made to have 62% of the area of the cable conductor and path 14 to have 38%, then the split type conductor may be operated without danger of overloading either parallel path. Curve d shows the copper lots for this ratio. In this case, it will be observed that the losses never go below 62% of the total loss, i. e. the losses will always be above those which prevail when the cable carries 78.5% of the maximum rated current.

Curve e in Figure 2 is of interest in that it indicates how the previously described method of operation may be modified. To obtain this curve, the losses are permitted to decrease in accordance with curve a until 78.5% of rated load is being carried by the conductor. As the load continues to drop below 78.5%, then the current transformer will be utilized to hold the losses constant at 62% as shown by the horizontal portion of the curve.

Having determined that the preferred ratio of cross sectional areas for the parallel paths 13 and 14 should be 62 to 38, it is important to consider just how much the conductor temperature normally changes. For the maximum temperature a hot summer month has been considered with the load at a maximum and for the minimum temperature a cold winter month has been taken with the load carried by the cable nearly 0.

In Figure 3 there is shown a conventional load temperature chart for a cable, which in this instance comprises a conventional three conductor shielded type, 350,000 C. M., 27 kv., 60 cycle, 21/64 inch insulation, having sector conductors and an outside diameter of 3 inches.

Now, assuming the duct air to be 40° C. and the maximum allowable continuous load 300 amperes, it will be observed that the ultimate copper temperature will be 77° C. for summer operation. A minimum duct temperature of 20° C. during the winter and no load on the cable will bring the minimum copper temperature to substantially 20° C. These values may be found by taking the duct temperature on the temperature scale and following the dotted line for the duct temperature chosen until it intersects the full heavy line for the current value used. Dropping vertically down from this point, the copper temperature may be read on the bottom scale. The conventional type cable being considered is therefore found to be subjected to temperature variations of from 77° C. to 20° C. If the split conductor cable is considered for the same case, it will be observed from the curve shown in Figure 2 that the total losses are 100% at full load and that the cable temperature will therefore still be 77° C., but the minimum temperature will in this case be 62° C., or the losses will be 62% of the maximum. In the conventional cable temperature variations are approximately 57° C. as compared to 15° C. for the split core type cable, when operated to give the curve e as shown in Figure 2. In the case of the split conductor cable the variation in temperature is limited to 15° C. without overloading the parallel paths 13 and 14 by the use of the superimposed current. The temperature may be held in still closer limits by increasing the ratio of path 13 to path 14 without subjecting the cable to impractical operating conditions. For example, the ratio of 70 to 30 may be used, in which case the temperature variation would be substantially 12° C., but path 14 would carry more than its share when the cable carries between 0 and 23% of its rated load. This could from a practical standpoint of operation be tolerated.

While with the described method of operation, it may be possible to maintain the cable temperature constantly at a maximum value, from a practical standpoint, it is not intended that the cable should thus be operated. During normal cable operation the maximum allowable load is usually carried only for a few hours on certain days. Pressure will build up within the cable during these hours of operation at maximum temperature, but the time during which this pressure prevails may not be long enough to make the sheath yield. Should the inelastic lead sheath expand, the inner pressure will decrease, but it will still remain a positive value. This pressure will decrease when the load decreases and would be expected to be slightly positive at 80% of the rated maximum load.

In Figure 4, there is shown a typical daily load curve which shows watt loss and copper temperature for ordinary cable and split core cable as described herein. Curve f shows the load variations during the day; curve g shows the variation of watt-loss for different periods of the day for ordinary cable. Curve h shows conductor temperature changes during the day for ordinary cable. Curves i and j respectively show watt-loss and copper temperature during the day for the split core type cable. In this case, a ratio between the cross sectional areas of the parallel paths 13 and 14 of 62 to 38 has been used. From these curves, it will be apparent that the use of a split core type cable when operated in the manner previously described, results in a more even temperature of the cable than where ordinary cable is used.

Although in Figure 1, the split core is disclosed as extending throughout the length of the cable run, it is contemplated that, if desired, the entire run may be composed of sections, each section containing its individual transformer for circulating heating current within that section.

The term "impedance" in the foregoing description and claims is used in its broad sense to mean—the total opposition in an electric circuit to the flow of an alternating current.

From the foregoing, it will be apparent that this invention provides a novel method and means for controlling the temperature of a cable and that its use enables the cable temperature to be maintained substantially constant irrespective of the load which is being carried; which embraces a novel cable having a split core which enables load current to be carried through the cable and simultaneously an auxiliary current to be superimposed on the load current, the auxiliary current being circulated within the cable in the loop formed by the parallel paths of the split conductor; and an arrangement whereby the heating of the cable is not dependent upon the load current losses, but may be controlled independently thereof.

Now, it is of course to be understood that although I have described in detail the preferred embodiment of my invention, the invention is not to be thus limited but only insofar as defined by the scope and spirit of the appended claims.

I claim as my invention:

1. In combination a cable having a pair of parallel paths forming a loop within the cable, said loop being arranged to conduct load current through the cable, and a transformer having its secondary formed solely by said loop, whereby auxiliary current may be circulated in the loop at the same time the cable is conducting load current.

2. In combination, a cable having a split conductor forming a loop defining parallel paths for the passage of the load currents, and means for circulating current other than load current in said loop to vary the impedance to the flow of load current in one of said paths, said means comprising a transformer in which the loop forms a closed secondary.

3. The method of controlling the temperature in a cable having a split conductor forming a loop and defining a pair of parallel paths for the load current, which consists in circulating a current other than load current around said loop in a direction to oppose the flow of current in one of said paths, whereby the current flow through the other path may be increased to increase the heating of the cable.

4. The method of controlling the temperature in a cable having a split conductor forming a loop and defining a pair of parallel paths for the load current, which consists in varying the amount of load current in said paths by the circulation around said loop of a current other than load current in a direction to oppose the flow of load current in one of the paths.

5. The method of controlling the temperature of a cable having parallel electrical paths therethrough with their ends connected to form a loop, which consists in conducting the load through said parallel paths, and circulating through said paths as a loop a superposed current of such magnitude and direction relative to the load current as to maintain the cable temperature due to $i^2R$ losses substantially constant for different values of load current.

6. The method of controlling the temperature of a cable having parallel electrical paths therethrough with their ends connected to form a loop, which consists in conducting the load through said parallel paths, and circulating through said paths as a loop a superposed current of such magnitude and phase direction relative to that of the load current as to maintain the cable temperature due to $i^2R$ losses substantially constant for different values of load current.

7. The method of controlling the temperature of a cable having parallel electrical paths therethrough with their ends connected to form a loop, which consists in conducting the load current through said parallel paths, and circulating through said paths as a loop a superposed current of such magnitude and phase direction relative to that of the load current in said paths as to maintain the cable temperature due to $i^2R$ losses substantially constant for different values of load current.

8. In combination a split conductor forming parallel load current paths having cross-sectional areas of a ratio of substantially 62 to 38, said paths being connected together at their ends to form a loop, and transformer means connected to said loop, whereby a current may be circulated therein to maintain the $i^2R$ losses above substantially 62% of the full load losses, without overloading said paths.

JOSEPH K. H. STICHER.